United States Patent [19]

Kato et al.

[11] Patent Number: 4,590,517
[45] Date of Patent: May 20, 1986

[54] SUBTRACTION PROCESSING METHOD FOR RADIATION IMAGES

[75] Inventors: Hisatoyo Kato; Takao Komaki, both of Kanagawa, Japan

[73] Assignee: Fuji Photo Film Co., Ltd., Kanagawa, Japan

[21] Appl. No.: 477,542

[22] Filed: Mar. 21, 1983

[30] Foreign Application Priority Data

Mar. 20, 1982 [JP] Japan ................................ 57-45475

[51] Int. Cl.$^4$ .......................................... H05B 33/12
[52] U.S. Cl. ................................... 358/111; 128/659; 250/327.2; 250/363 R; 250/484.1; 364/414
[58] Field of Search ................ 358/110, 111; 364/414; 250/484.1, 327.2, 315.3, 363 R; 128/659

[56] References Cited

U.S. PATENT DOCUMENTS

| | | | |
|---|---|---|---|
| 4,236,078 | 11/1980 | Kotera | 250/363 R |
| 4,258,264 | 3/1981 | Kotera | 250/484.1 |
| 4,323,973 | 4/1982 | Greenfield | 358/111 |
| 4,346,295 | 8/1982 | Tanaka | 250/327.2 |
| 4,394,581 | 7/1983 | Takahashi | 250/484.1 |

OTHER PUBLICATIONS

"Gazo Shindan", vol. 4, Supplement 1, 1984, pp. 112-114.

*Primary Examiner*—Howard W. Britton
*Attorney, Agent, or Firm*—Sughrue, Mion, Zinn, Macpeak & Seas

[57] ABSTRACT

Two or more stimulable phosphor sheets are exposed to a radiation passing through an object under conditions different from one another, and radiation images of the object at least partially different from one another are recorded on the stimulable phosphor sheets. The stimulable phosphor sheets are then scanned with stimulating rays to convert the radiation images into light, which is photoelectrically read out and converted into digital image signals. The digital image signals are subjected to a subtraction processing with respect to the corresponding picture elements of the images, thereby to obtain a signal for forming an image of a specific structure of the object.

9 Claims, 6 Drawing Figures

FIG. 1A
FIG. 1B
FIG. 1C
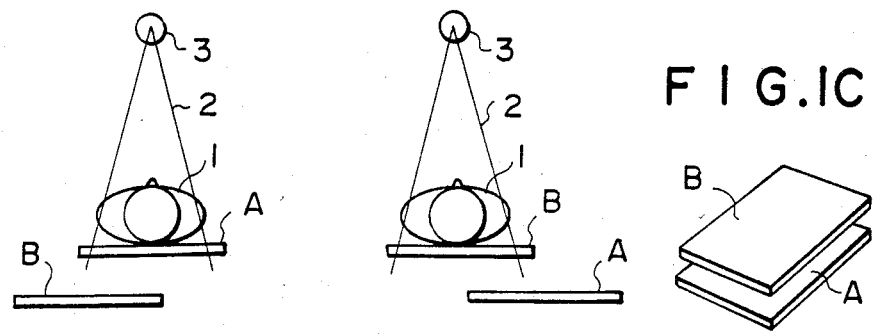
FIG. 2
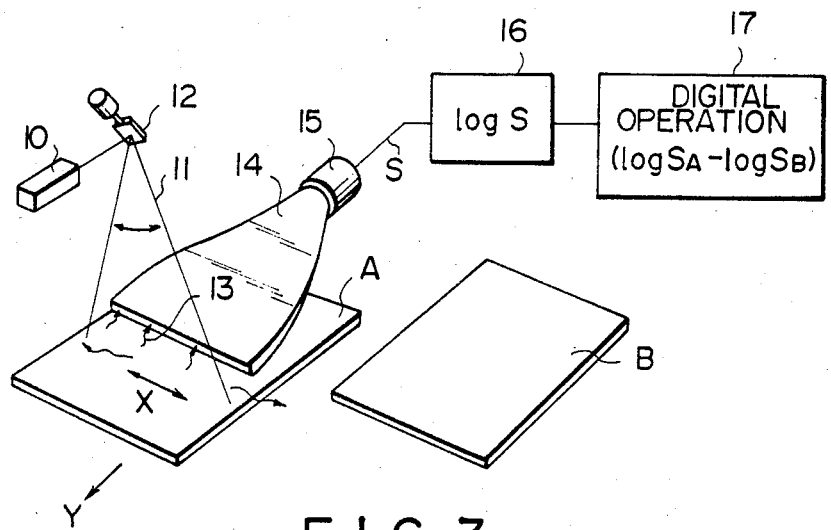
FIG. 3
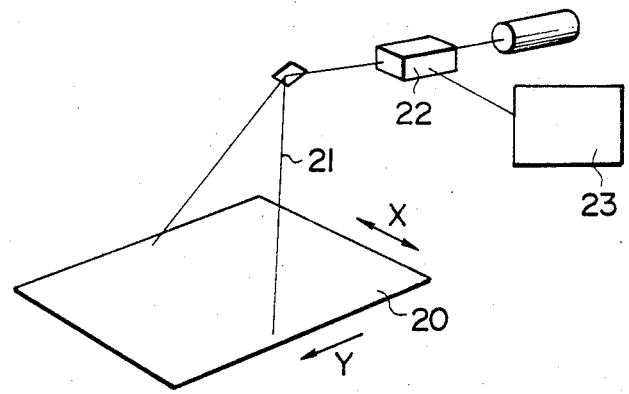

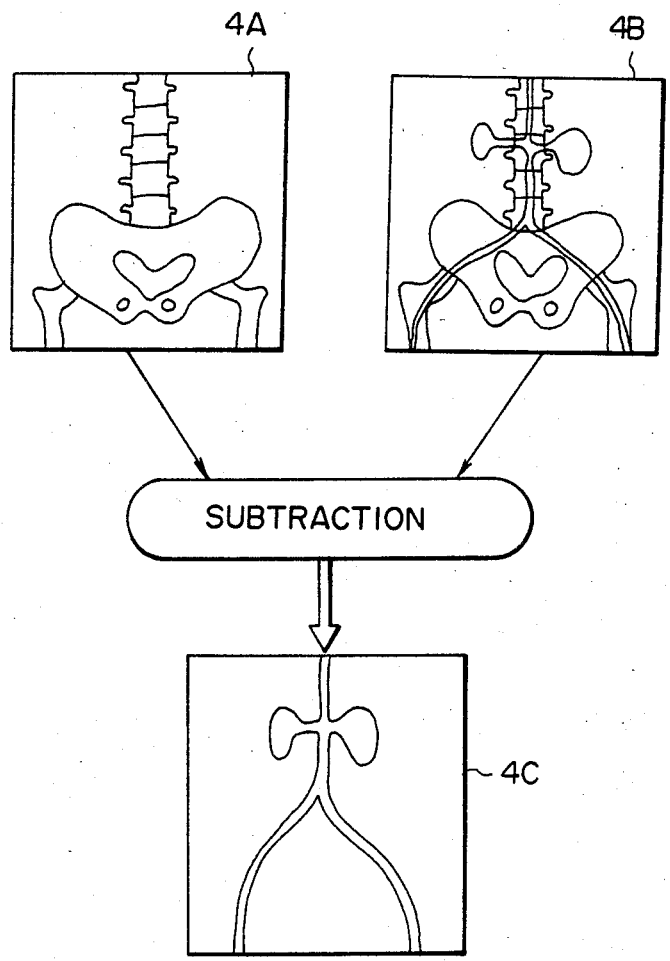

SUBTRACTION PROCESSING METHOD FOR RADIATION IMAGES

BACKGROUND OF THE INVENTION

1. Field of the Invention

This invention relates to a subtraction processing method for radiation images, and more particularly to a method and apparatus for carrying out digital subtraction for radiation images by use of stimulable phosphor sheets.

2. Description of the Prior Art

Conventionally, a digital subtraction method is used for processing radiation images. In the method, two radiation images recorded under conditions different from each other are photoelectrically read out to obtain digital image signals, which are then subjected to a subtraction processing with respect to the corresponding picture elements of the images, thereby to obtain a signal for forming an image of a specific structure contained in the radiation images. The method makes it possible to reproduce a radiation image of only the specific structure by use of the thus obtained signal.

Basically, the subtraction processing is classified into the so-called temporal (time difference) subtraction processing method and the so-called energy subtraction processing method. In the former method, an image of a specific structure is extracted by subtracting the digital image signal of an X-ray image obtained without injection of a contrast media from the digital image signal of an X-ray image in which the image of the specific structure is enhanced by the injection of a contrast medium. In the latter method, an object is exposed to X-rays having energy distributions different from each other to obtain two X-ray images respectively containing the images of a specific structure recorded on the basis of the intrinsic X-ray energy absorption characteristics of the specific structure. Then, the two X-ray images are weighted appropriately, and subjected to subtraction to extract the image of the specific structure.

Since the subtraction processing is extremely effective for diagnostic purposes in image processings for medical X-ray photographs, it has recently attracted much attention, and research has continued to develop improved methods by use of electronic technology. The processing technique is particularly called digital subtraction processing method or, normally, digital radiography (abbreviated as "DR").

As the DR systems, there have heretofore been known digital fluorography using an X-ray fluoroscopic camera comprising a combination of an image intensifier tube (I.I. tube) and a television camera, which is categorized as the aforesaid time difference subtraction processing method, and scanned projection radiography using a line sensor, which is categorized as the aforesaid energy subtraction processing method.

In the digital fluorography, since an I.I. tube and a television camera are used, the image quality (particularly resolving power) in the scanning systems of these components is low. Further, since many signal conversion systems are used, the digital fluorography exhibits very low image quality and is practically unsatisfactory for obtaining detailed information of radiation images. The digital fluorography is also disadvantageous in that, since the recordable picture size is limited by the size of the light receiving face of the I.I. tube, the digital fluorography cannot be used for large objects.

In the scanned projection radiography, a line sensor is moved along an object and, at the same time, the energy level of the X-ray source is alternately changed for each scanning line so as to divide one image into two stripe-like components of high and low energy levels, respectively. The respective image signals thus obtained are then subjected to subtraction processing. Accordingly, the image resolving power decreases at least to half, and the scanned projection radiography exhibits very low image quality as in the case of the aforesaid digital fluorography.

Radiation images used for diagnostic purposes, such as those recorded on medical X-ray photographs, are required to exhibit particularly high resolving power and high image quality with respect to the image density and contrast. Although the aforesaid DR is a revolutionary technique from the viewpoint of the subtraction processing, it is practically unsatisfactory, and a need exists for drastic improvements thereof.

SUMMARY OF THE INVENTION

The primary object of the present invention is to provide a subtraction processing method and apparatus for radiation images which provides a subtraction processed image of markedly high image quality.

Another object of the present invention is to provide a subtraction processing method and apparatus for radiation images which provides a subtraction processed image of even a large picture size.

The specific object of the present invention is to provide a subtraction processing method and apparatus for radiation images which provides a subtraction processed image markedly valuable for medical diagnosis.

The subtraction processing method in accordance with the present invention is characterized by the use of two or more stimulable phosphor sheets which exhibit high resolving power and an extremely wide latitude of exposure to a radiation and which are easy to increase the picture size, instead of using an electronic scanning device such as I.I. tube, TV camera or image sensor. The method in accordance with the present invention uses two or more stimulable phosphor sheets exposed to a radiation transmitting through an object under conditions different from one another and stored radiation images of said object therein, at least a part of image information being different among said radiation images, and reads out said radiation images by scanning thereof with stimulating rays and converting said radiation images into digital signals, and conducts digital subtraction of said digital signals.

The subtraction processing apparatus in accordance with the present invention comprises a means for scanning two or more stimulable phosphor sheets exposed to a radiation transmitting through an object under conditions different from one another and stored radiation images of said object therein, at least a part of image information being different among said radiation images with a stimulating rays, a means for photoelectrically converting a light emitted from said stimulable phosphor sheets into electric image signals, a means for converting electric image signals obtained into digital image signals, and a means for conducting subtraction of said digital image signals between the corresponding picture elements of said radiation images to obtain a signal for forming an image of a specific structure contained in at least one of said radiation images.

The stimulable phosphor sheets used in the present invention comprises a stimulable phosphor which is able to store a part of radiation energy when exposed to a radiation such as X-rays, $\alpha$-rays, $\beta$-rays, $\gamma$-rays or ultraviolet rays, and then emits light in proportion to the stored energy of the radiation when exposed to stimulating rays such as visible light, as disclosed for example in U.S. Pat. No. 4,258,264. The stimulable phosphor sheets exhibit an extremely wide latitude of exposure and a markedly higher resolving power than the resolving power of the light receiving face of an I.I. tube, TV camera, or the like. Accordingly, it is possible to obtain a radiation image having sufficient density and a high diagnostic efficiency and accuracy regardless of the amount of exposure of the stimulable phosphor sheets to the radiation by utilizing the radiation images stored in the stimulable phosphor sheets.

Further, the use of the stimulable phosphor sheet is very advantageous in that the electric signal obtained by reading out the radiation image stored in the stimulable phosphor sheet can be delete processed and reproduced into a visible image on a recording medium such as photographic light-sensitive material or on a display such as cathode ray tube (CRT), thereby to obtain a radiation image suitable for viewing, particularly diagnostic purposes.

As mentioned above, in the radiation image system using a stimulable phosphor, deviation of the level of the radiation energy stored in the stimulable phosphor from a desired level can easily be compensated by setting the read-out gain to an appropriate value when photoelectrically reading out the light emitted from the stimulable phosphor upon stimulation thereof. Therefore, the quality of the reproduced radiation image is not adversely affected by a fluctuation in radiation dose due to fluctuating tube voltage or MAS value of the radiation source, a variation in the sensitivity of the stimulable phosphor or the photodetector, a fluctuation in radiation does according to the condition of the object, or a fluctuation in the radiation transmittance according to the object etc. Further, it is possible to obtain a desirable radiation image even when the radiation dose to the object is reduced. Further, it is possible to obtain a radiation image having high image quality of high contrast, high sharpness and low noise etc. by once converting the light emitted from the stimulable phosphor into an electric signal, and processing the electric signal as desired. Particularly, when the radiation image is used for medical diagnosis, it is possible to obtain a radiation image processed in accordance with the portion of a human body such as the heart, the chest etc. and improve the diagnostic efficiency and accuracy.

As the stimulable phosphor, for example, rare earth element activated alkaline earth metal fluorohalide phosphor is preferred. One example of this phosphor is, as shown in U.S. patent application Ser. No. 57,080, filed July 7, 1979, now abandoned, a phosphor represented by the formula $(Ba_{1-x-y}, Mg_x, Ca_y)FX:aEu^{2+}$ wherein X is at least one of Cl and Br, x and y are numbers satisfying $0 < x+y \leq 0.6$ and $xy \neq 0$, and a is a number satisfying $10^{-6} \leq a \leq 5 + 10^{-2}$. Another example of this phosphor is, as shown in U.S. Pat. No. 4,239,968, a phosphor represented by the formula $(Ba_{1-x}, M^{II}x)FX:yA$ wherein $M^{II}$ is at least one of Mg, Ca, Sr, Zn and Cd, X is at least one of Cl, Br and I, A is at least one of Eu, Tb, Ce, Tm, Dy, Pr, Ho, Nd, Yb and Er, x is a number satisfying $0 \leq x \leq 0.6$, and y is a number satisfying $0 \leq y \leq 0.2$. Further, as the stimulable phosphor to be used in this invention can be used $ZnS:Cu,Pb$; $BaO \cdot xAl_2O_3:Eu$ wherein $0.8 \leq x \leq 10$; and $M^{II}O \cdot xSiO_2:A$ wherein $M^{II}$ is Mg, Ca, Sr, Zn, Cd or Ba, A is Ce, Tb, Eu, Tm, Pb, Tl, Bi or Mn, and x is number satisfying $0.5 \leq x \leq 2.5$, as shown in U.S. Pat. No. 4,236,078. Furthermore, as the stimulable phosphor can be used $LnOX:xA$ wherein Ln is at least one of La, Y, Gd and Lu, X is at least one of Cl and Br, A is at least one of Ce and Tb, x is a number satisfying $0 < x < 0.1$, as shown in U.S. Pat. No. 4,236,078. Among the above enumerated phosphors, the rare earth element activated alkaline earth metal fluorohalide phosphor is the most preferable, among which barium fluorohalides are the most preferable in view of the high intensity of emission of light.

Further, barium fluorohalide phosphors added with a metal fluoride as disclosed in Japanese Unexamined Patent Publication Nos. 56(1981)-2385 and 56(1981)-2386, or barium fluorohalide phosphors added with at least one of a metal chloride, a metal bromide and a metal iodide as disclosed in U.S. patent application Ser. No. 367,665, filed Apr. 4, 1982, now abandoned, (European Patent Publication No. 29,963) are also preferable because of their improved light emitting characteristics.

It is also desirable to color the phosphor layer of the stimulable phosphor sheet made of the above phosphor by use of pigments or dyes to improve the sharpness of the image obtained thereby as disclosed in, U.S. patent application Ser. No. 156,520, now U.S. Pat. No. 4,394,581 (European Patent Publication No. 21,174).

In the present invention, the expression "exposed to a radiation transmitting through an object under conditions different from one another to have radiation images of said object stored in said stimulable phosphor sheets, at least a part of image information being different among said radiation images" embraces both of the aforesaid time difference subtraction and the energy subtraction, and means that a section corresponding to the portion of the blood vessel in angiography in the case of the time difference subtraction, or a section corresponding to the portion of an organ, bone, blood vessel or the like in the case of the energy subtraction is recorded on the two or more stimulable phosphor sheets under conditions different among the stimulable phosphor sheets. Namely, in the case of the time difference subtraction, radiation images of an object are recorded on two or more independent stimulable phosphor sheets before and after injection of a contrast medium into the object. In the case of the energy subtraction, radiation images of an object are recorded on discrete stimulable phosphor sheets by use of radiation energy levels different among the stimulable phosphor sheets.

In the case of the energy subtraction, radiation images of an object should be recorded on discrete stimulable phosphor sheets by use of radiation energy levels different among the stimulable phosphor sheets. This may be achieved, for example, by sequentially exposing a plurality of stimulable phosphor sheets to a radiation source having the energy level of which is changed for the respective stimulable phosphor sheets, or by exposing a stack of a plurality of stimulable phosphor sheets with radiation energy-absorbing sheets interposed therebetween to a radiation all at once. The former method is advantageous in that images of the same magnification factor can always be obtained and energy discrimination can be effected distinctly and easily.

However, from the viewpoint of the recording speed, the latter method is superior to the former method.

After the radiation images are recorded on the stimulable phosphor sheets, the radiation images are read out by use of stimulating rays. The recording step and the read-out step may be repeated for each stimulable phosphor sheet. However, from the viewpoint of practical use, the recording step should desirably be conducted for a number of stimulable phosphor sheets necessary for the subtraction, and then the read-out step be conducted collectively for all stimulable phosphor sheets. This procedure is desirable particularly when the recording step and the read-out step are performed at different locations, for example, when realizing a system wherein radiation images are recorded on stimulable phosphor sheets in a movable X-ray diagnostic station and then read out from the stimulable phosphor sheets in a hospital.

The amounts of light emitted from the stimulable phosphor sheets carrying the radiation images stored therein when exposed to stimulating rays should preferably be converted to logarithmic digital signals. This is desired because unevenness (ununiformity) of the sensitivity of the stimulable phosphor sheets and fluctuation of energy of the radiation source, if any, can be ignored through the subtraction of the logarithmic values.

BRIEF DESCRIPTION OF THE DRAWINGS

FIG. 1A is a schematic view showing the first stage of the radiation image recording step in the method in accordance with the present invention, FIG. 1B is a schematic view showing the second stage of the radiation image recording step in the method in accordance with the present invention, FIG. 1C is a schematic view showing two stimulable phosphor sheets carrying radiation images stored therein in the recording step conducted as shown in FIGS. 1A and 1B, FIG. 2 is a schematic view showing the step of causing each of the stimulable phosphor sheets shown in FIG. 1C to emit light upon stimulation thereof in the pattern of the radiation image stored therein, photoelectrically converting the emitted light to obtain digital signals and conducting the subtraction processing of the digital signals, FIG. 3 is a schematic view showing the step of reproducing a subtraction processed image on a light sensitive film by use of the signal obtained by the subtraction processing, and FIG. 4 is an explanatory view visually showing the X-ray images for diagnostic purposes before and after the subtraction processing in accordance with the present invention.

DESCRIPTION OF THE PREFERRED EMBODIMENTS

The present invention will hereinbelow be described in further detail with reference to the accompanying drawings.

Referring to FIGS. 1A and 1B, two stimulable phosphor sheets A and B are respectively exposed to X-rays 2 passing through an object 1 under conditions different from each other. For example, in the case of angiography (digital angiography) using the time difference subtraction, an X-ray transmission image of the object 1 before the injection of a blood vessel contrast medium thereto is recorded on the first stimulable phosphor sheet A as shown in FIG. 1A. Then, a contrast medium is injected into the vein of the same object 1. After a certain period, for example after about 10 seconds in the case of the abdomen, an X-ray transmission image of the object is recorded in the same manner on the second stimulable phosphor sheet B as shown in FIG. 1B. At both recording stages, the tube voltage of an X-ray source 3 is maintained at the same value, and the relationship between the positions of the object 1 and the stimulable phosphor sheet A is made equal to the relationship between the positions of the object 1 and the stimulable phosphor sheet B. Thus, two X-ray images of the same object 1 are recorded on the stimulable phosphor sheets A and B in exactly the same manner, except for the existence of the contrast medium in the object 1.

In the case of the energy subtraction, for example, the time interval between the recording stages shown in FIGS. 1A and 1B should be minimized as possible, and the stimulable phosphor sheets A and B are quickly replaced with each other. At the same time, the tube voltage of the radiation source 3 is changed to record two X-ray images of the same object 1 on the stimulable phosphor sheets A and B in exactly the same manner, except for the energy level of the X-rays transmitting through the object 1.

As described above, two radiation images wherein at least a part of the image information is different from each other are recorded on the stimulable phosphor sheets A and B. In the embodiment described above, two stimulable phosphor sheets A and B are used in order to later conduct the subtraction processing between two images. However, it is also possible to use three or more stimulable phosphor sheets such as A, B and C in order to later conduct the subtraction processing for the image signals obtained from the three or more sheets. In these cases, a superposing technique of the plurality of image signals disclosed in Japanese Patent Unexamined Publication Nos. 56(1981)—11399, 56(1981)—13934 and 56(1981)—11400 may be used together for example, like A+B−C).

From the stimulable phosphor sheets A and B (shown in FIG. 1C) carrying the X-ray images stored therein, the X-ray images are read out by use of the read-out system as shown in FIG. 2 to obtain digital image signals representing the X-ray images. First, while the stimulable phosphor sheet A is moved in the direction of the arrow Y to conduct sub-scanning, a laser beam 11 emitted from a laser source 10 is deflected in the direction of the arrow X by a scanning mirror 12 to conduct main scanning. In this manner, the stimulable phosphor sheet A is caused to release the X-ray energy stored therein as light 13 in proportion to the X-ray energy. The emitted light 13 is entered into the interior of a light collecting sheet 14, which is made by forming a transparent acrylic sheet, from one end face thereof. The light collecting sheet 14 may be of a shape and a material as disclosed in U.S. Pat. No. 4,346,295, DE-OS No. 2,951,501 or European Patent Publication No. 32,521. The light 13 is then transferred to a photomultiplier 15 through total reflection in the interior of the light collecting sheet 14, and the amount of the light 13 is outputted from the photomultiplier 15 as an image signal S. The image signal S is then converted to a digital image signal $\log S_A$ of a logarithmic value (logS) by a log-converter 16 comprising an amplifier and an A/D converter. The digital image signal $\log S_A$ is entered into a digital operation unit 17 and stored therein.

Thereafter, the X-ray image stored in the other stimulable phosphor sheet B is read out therefrom in exactly the same manner as described above, and a digital image signal $\log S_B$ thus obtained is stored in the digital operation unit 17.

The digital operation unit 17 calculates the difference between the digital image signals $\log S_A$ and $\log S_B$ for each corresponding picture element, and conducts the digital subtraction processing. In the case of the time difference subtraction, the subtraction may simply be conducted. In the case of the energy subtraction, each digital image signal is multiplied by appropriate weight factors, and then subjected to the subtraction to erase a predetermined structure (for example, the bone) and obtain a signal for forming an image of only a desired specific structure (for example, the blood vessel or the organ).

The digital subtraction processing is conducted as described above. The signal thus obtained is used, for example, for reproducing a visible radiation image on a display or on a recording medium by the point by point scanning.

By way of example, FIG. 3 shows the step of reproducing a visible radiation image on a recording medium by the scan recording method. In FIG. 3, a light-sensitive film 20 is moved in the sub-scanning direction shown by the arrow Y, and at the same time a laser beam 21 is deflected onto the light-sensitive film 20 in the main scanning direction indicated by the arrow X. The laser beam 21 is modulated by an A/O modulator 22 with an image signal sent from an image signal feeder 23, thereby to form a visible image on the light-sensitive film 20. By using the output of the aforesaid digital operation unit 17 as the image signal sent from the image signal feeder 23, it is possible to reproduce a visible image of a desired specific structure obtained by the digital subtraction processing on the light-sensitive film 20.

FIG. 4 shows the manner in which an image of a desired specific structure is obtained by the time difference subtraction processing by use of the method in accordance with the present invention. In FIG. 4, a reference character 4A designates an image obtained from the first stimulable phosphor sheet A in which an X-ray image of the abdomen before the injection of a contrast medium thereto is stored. A reference character 4B designates an image obtained from the second stimulable phosphor sheet B in which an X-ray image of the same abdomen after the injection of a contrast medium thereto is stored. A reference character 4C denotes an image obtained after conducting the subtraction processing by subtracting a digital image signal representing the image 4A from a digital image signal representing the image 4B, so that only the blood vessel can be observed.

We claim:

1. A subtraction processing method for radiation images comprising the steps of:
    (a) scanning two or more stimulable phosphor sheets exposed to a radiation transmitting through an object under conditions different from one another and stored radiation images of said object therein, at least a part of image information being different among said radiation images with stimulating rays,
    (b) photoelectrically reading out the amounts of said emitted light and converting them into digital image signals, and
    (c) conducting subtraction of said digital image signals between the corresponding picture elements of said radiation images to obtain a signal for forming an image of a specific structure contained in at least one of said radiation images.

2. A method as defined in claim 1 wherein said photoelectric read-out is conducted by scanning said stimulable phosphor sheets with the same stimulating rays after the recording on all of said stimulable phosphor sheets is finished.

3. A method as defined in claim 1 or 2 wherein said conversion of the read out amounts of said emitted light into the digital image signals is conducted by converting the logarithmic values of the amounts of said emitted light into digital values.

4. A subtraction processing method for radiation images comprising the steps of:
    (a) scanning two or more stimulable phosphor sheets exposed to a radiation transmitting through an object under conditions different from one another and stored radiation images of said object therein, at least a part of image information being different among said radiation images with stimulating rays,
    (b) photoelectrically reading out the amounts of said emitted light and converting them into digital image signals,
    (c) conducting subtraction of said digital image signals between the corresponding picture elements of said radiation images to obtain a signal for forming an image of a specific structure contained in at least one of said radiation images, and
    (d) reproducing a radiation image of said specific structure by use of said signal.

5. A method as defined in claim 4 wherein said reproducing is conducted by optically recording a visible image on a light-sensitive material.

6. A method as defined in claim 4 wherein said reproducing is conducted by displaying a visible image on a display.

7. A method as defined in any of claims 4 to 6 wherein said reproducing is conducted by once electrically recording said signal for forming an image of a specific structure on a recording medium, and then reproducing said recorded signal.

8. A subtraction processing apparatus for radiation images comprises;
    a means for scanning two or more stimulable phosphor sheets exposed to a radiation transmitting through an object under conditions different from one another and stored radiation images of said object therein, at least a part of image information being different among said radiation images with a stimulating rays,
    a means for photoelectrically converting a light emitted from said stimulable phosphor sheets into electric image signals,
    a means for converting electric image signals obtained into digital image signals, and
    a means for conducting subtraction of said digital image signals between the corresponding picture elements of said radiation images to obtain a signal for forming an image of a specific structure contained in at least one of said radiation images.

9. A subtraction processing apparatus for radiation images comprises;
    a means for scanning two or more stimulable phosphor sheets exposed to a radiation transmitting through an object under conditions different from one another and stored radiation images of said object therein, at least a part of image information being different among said radiation images with a stimulating rays, a means for photoelectrically converting a light emitted from said stimulable phosphor sheets into electric image signals, a means for converting electric image signals obtained into digital image signals, a means for conducting subtraction of said digital image signals between the corresponding picture elements of said radiation images to obtain a signal for forming an image of a specific structure contained in at least one of said radiation images; and a means for reproducing a radiation image of said specific structure by use of said signal.

* * * * *